United States Patent [19]

Ebisaka

[11] Patent Number: 4,635,157

[45] Date of Patent: Jan. 6, 1987

[54] GENERATOR PROTECTING RELAY

[75] Inventor: Toshinobu Ebisaka, Hyogo, Japan

[73] Assignee: Mitsubishi Denki Kabushiki Kaisha, Tokyo, Japan

[21] Appl. No.: 693,901

[22] Filed: Jan. 22, 1985

[30] Foreign Application Priority Data

Jan. 27, 1984 [JP] Japan ............................ 59-11882

[51] Int. Cl.$^4$ .............................................. H02H 7/06
[52] U.S. Cl. ...................................... 361/20; 361/91; 361/93; 322/27; 322/99
[58] Field of Search .................. 361/20, 21, 91, 93; 322/20, 25, 27, 22, 99, 19, 27.99; 323/210

[56] References Cited

U.S. PATENT DOCUMENTS 2,932,782 4/1960 Newbold et al. ...................... 322/22
4,393,345 7/1983 Fork et al. ............................. 361/20

Primary Examiner—A. D. Pellinen
Assistant Examiner—Jeffrey A. Gaffin
Attorney, Agent, or Firm—W. E. Zitelli

[57] ABSTRACT

A protective relay having an operational boundary matched substantially to the output performance limit characteristics of a generator to enhance the protection. The protective relay generates a signal representative of a discriminating impedance based on measurements of the generator's terminal voltage and current. The relay utilizes two pairs of predetermined values which characterize in part the generator's output performance limit curves. Two corresponding pairs of vector signals are generated by the relay based on their respectively corresponding pairs of predetermined values and the generated discriminating impedance signal. The angles between the vector pairs are measured by the relay and are compared with predetermined angle values which also represent in part the generator's output performance limitations. Leading and lagging conditions of at least one of the vector pairs affects the selection of the predetermined angle value used in the comparison with the measured angle associated therewith. Should the results of the comparisons indicate that the measured angles are beyond their respective predetermined angle values, then the protective relay signifies that an unsafe generator operating condition exists.

10 Claims, 5 Drawing Figures

GENERATOR PROTECTING RELAY

BACKGROUND OF THE INVENTION

The present invention relates generally to protective relays for protecting an electrical generator of the type characterized by output performance limit curves, and more particularly, to a protective relay having an operational boundary matched substantially to the output performance limit characteristics of the generator to enhance the protection thereof.

Typical generator output performance limiting curves are shown in the graph of FIG. 1 which depicts the real or effective power component of the generator on the abscissa and the reactive power component of the generator on the ordinate. Curves 11 and 12 denote delay and lead reactive power component limit curves of the generator and curve 13 denotes an effective or real power component limit curve of the generator. The hatched zone in FIG. 1 illustrates a power output zone in which the generator may continuously operate.

FIG. 2 is a graph illustrating the output performance limit curves of the generator in the form of an impedance diagram converted from the curves 11, 12 and 13 described in connection with the graph of FIG. 1. For example, curve 12a denotes an impedance conversion of curve 12 and represents the lead reactive component of the generator terminal, and curve 13a denotes an impedance conversion of curve 13 and represents the reactive component of the generator terminal associated therewith. In FIG. 2, the hatched areas outside of the curves 12a and 13a represent the permitted generator output performance areas. In addition, the hatched area 2 indicates the operating area of a typical field failure relay having a generator protecting function which utilizes the fact that the impedance calculated from the terminal voltage and current of the generator moves toward the center of a circle when the field of the generator is obviated. The area between the hatched circle 2 and the output limit performance curves 12a and 13a represents an area which exceeds the performance limits of the generator. Accordingly, if the generator is operating in an area like that shown by the hatched circle 2a, for example, it cannot be protected by the field failure relay having a protection zone exhibited by the hatched area 2.

From the above remarks, it is readily apparent that the conventional protection scheme for a generator has a disadvantage in that the field failure relay protective zone is not matched to the output performance limit curves of the generator, like 12a and 13a, for example, leaving an unprotected operational area such as that shown by the hatched area 2a which exceeds the output performance limits of the generator. The present invention proposes to eliminate substantially the aforementioned disadvantage and to provide a generator protective relay which has an operating boundary which is matched substantially to the output performance limits of the generator being protected.

SUMMARY OF THE INVENTION

In accordance with the present invention, a protective relay has an operational boundary matched substantially to the output performance limit characteristics of a generator which it is protecting to enhance the protection thereof. The protective relay generates a plurality of vector signals based on a generated discriminating impedance signal, derived from measurements of the generator's terminal voltage and current, and a representation of the output performance limit curves of the generator being protected. The relay determines when the generator is operating beyond its output performance limit characteristics based on a function of the plurality of vector signals. The representation of the output performance limit curves of the generator may be provided to the relay in the form of a plurality of predetermined signals.

In one embodiment, the plurality of predetermined signals is divided into first and second pairs of signals which the protective relay utilizes along with the discriminating impedance signal to generate corresponding first and second pairs of vector signals. The protective relay may then determine when the generator is operating beyond its output performance limit characteristics based on the angles between the first and second pairs of vector signals.

More specifically, the protective relay includes apparatus for measuring the angle between the first pair of vector signals and for generating a first signal when the measured angle is beyond a first predetermined angle value. Also included is apparatus for measuring the angle between the second pair of vector signals and for generating a signal representative of the measured angle. In addition, the protective relay determines if the second pair of vector signals is in a leading or lagging condition. When is a leading condition, the relay generates a second signal when the measured angle signal associated with the second pair of vector signals is beyond a second predetermined angle value; and when in a lagging condition, the relay generates the second signal when said measured angle signal is beyond a third predetermined angle value. Accordingly, the protective relay generates a signal indicative of the generator operating beyond its output performance limit characteristics when both the first and second signals are generated.

DESCRIPTION OF THE PREFERRED EMBODIMENT

Figure 3:
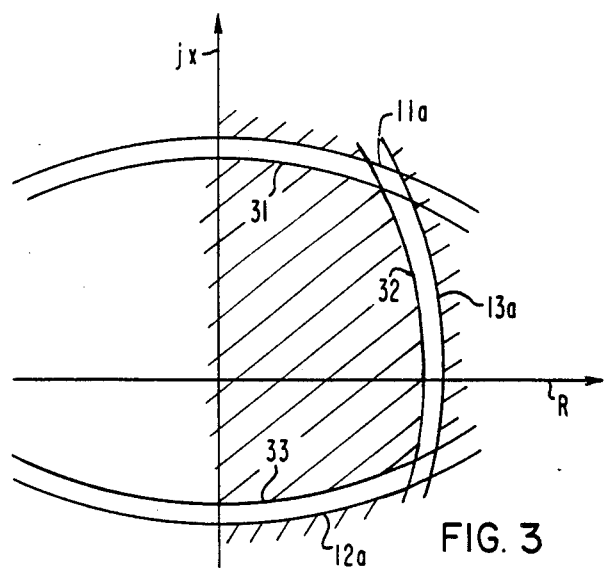
FIG. 3 is an impedance conversion graph illustrating the operating zone of a generator protective relay matched substantially to the output performance limit curves of a generator being protected thereby.

As described in the Background section hereabove, the present invention proposes to extend the generator protective relay operating zone to the output performance limit curve boundaries 11a, 12a, and 13a as illustrated by the impedance conversion graph of FIG. 3. In FIG. 3, the area surrounded by the curves 31, 32 and 33 represents the boundaries of the protective relay operating zone of the present invention and is indicative of the extended capability in protecting the generator by matching its protective zone boundaries 31, 32 and 33 to the output limit performance curves 11a, 13a and 12a, respectively, characterizing the generator.

Figure 1:
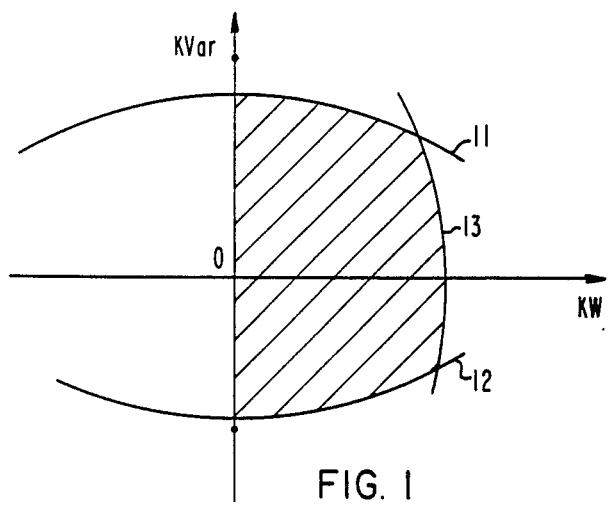
FIG. 1 is a graph of a power diagram illustrating typical generator output performance limit curves.
Figure 2:
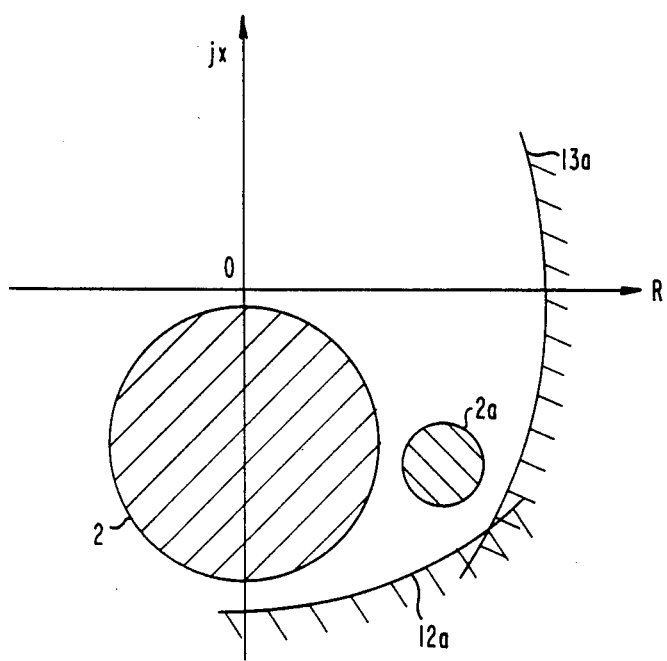
FIG. 2 is a graph of an impedance diagram illustrating the output performance limit curves of the generator converted from the curves of FIG. 1.

An embodiment of the present invention will be described hereabove in connection with FIGS. 4 and 5. Referring to FIG. 5, a conventional electrical generator 10 may provide energy to a power system network with an output power level generated at its output terminal depicted at 15. As described in the Background section hereabove, the output performance limits of the generator 10 may be designated in terms of power limitations or impedance limitations as illustrated in the graphs of FIGS. 1 and 2, respectively. In the present embodiment, the generator's terminal current and voltage are measured by a conventional current transformer 16 and potential transformer 17, for example, and signal representative thereof are supplied to a conventional impedance measuring circuit 18 for generating a signal representative of the discriminating impedance of the generator 10 based on the measurements of the generator's terminal voltage and current. In turn, the discriminating impedance signal VO is provided to a circuit 20 for generating a plurality of vector signals V1, V2, V3 (V'3) and V4 (V'4) based on the generated discriminating impedance signal VO and a representation of the output performance limit curves of the generator being protected. The functioning of the circuit 20 will be described in connection with the graph of FIG. 4.

Figure 4:
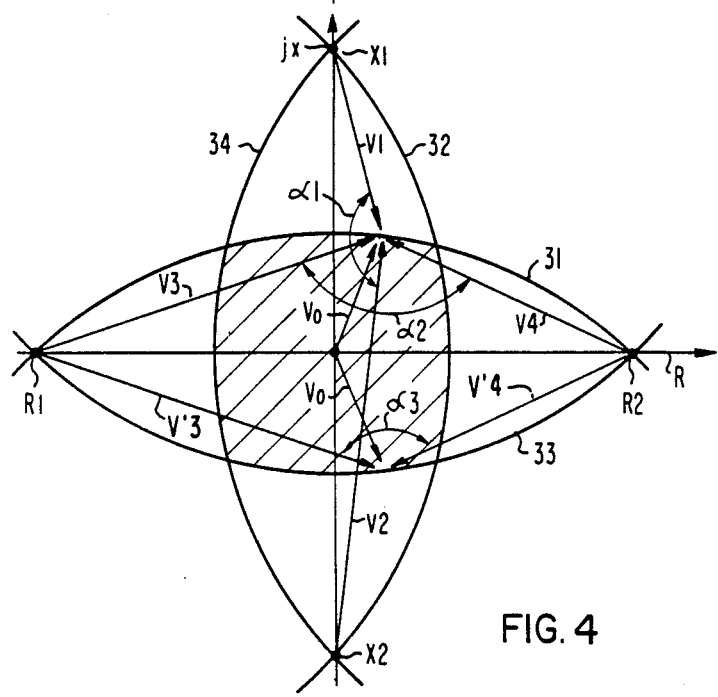
FIG. 4 is an impedance graph illustrating functionally the generation of a plurality of vector signals suitable for use in an embodiment of the present invention.
Figure 5:
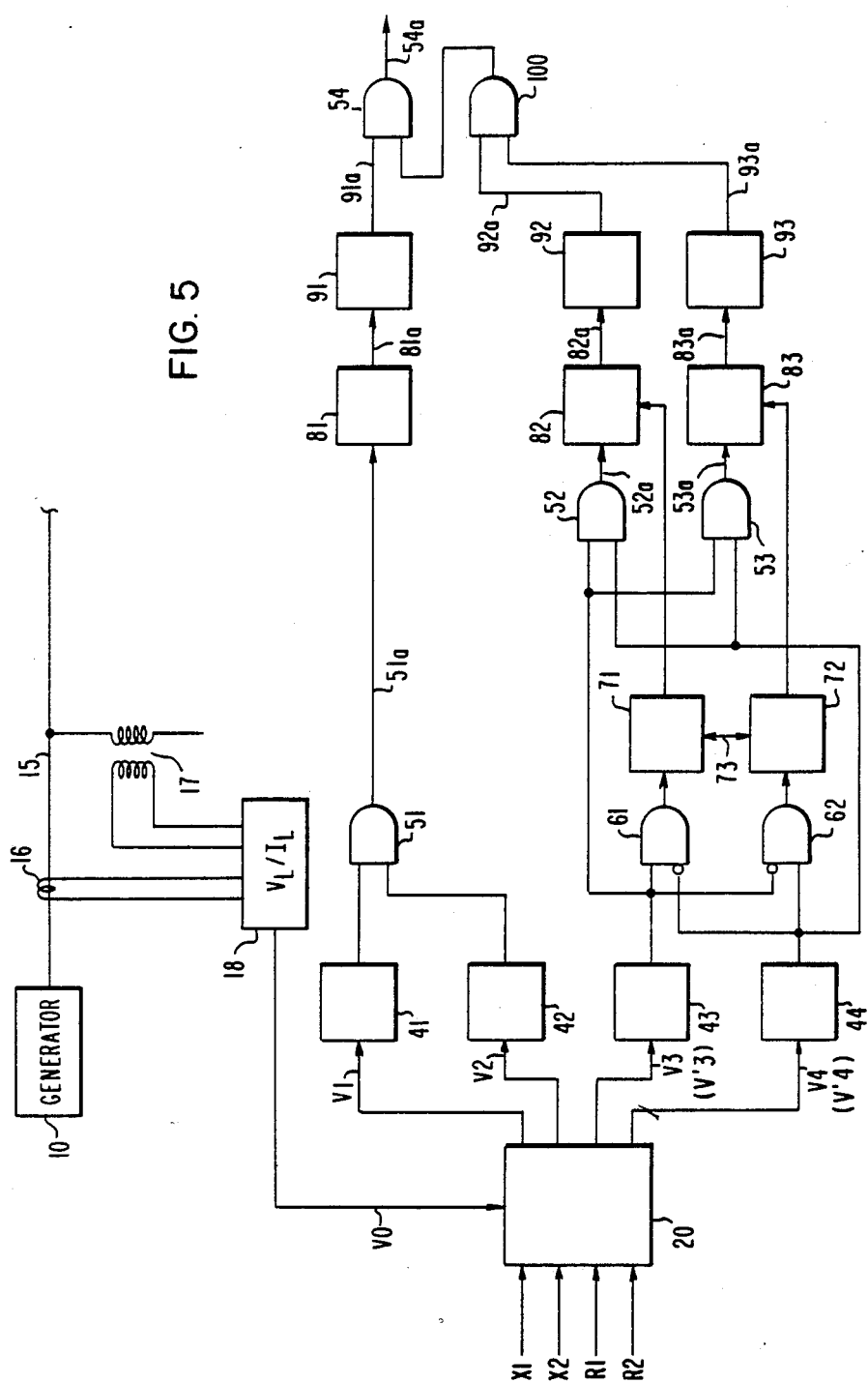
FIG. 5 is a block diagram schematic of a protective relay suitable for embodying the principles of the present invention.

Referring to FIG. 4, the curves 31, 32, 33 and 34 represent the outer boundaries of protective zone of the protective relay which are matched substantially to the outer performance limit curves of the generator, like the curves 11a, 12a and 13a depicted in FIG. 3, for example. As the curves 32 and 34 cross the ordinate, they form the predetermined values X1 and X2 which may be provided to the circuit 20 as signals representative of the curves 32 and 34. In a similar manner, as the curves 31 and 33 cross the abscissa, they form the predetermined values R1 and R2 which may also be provided to the circuit 20 as signals representative of the curves 31 and 33. The impedance signal VO derived from the voltage and current measurements is shown by the exemplary vectors VO in the graph of FIG. 4.

Vector signals V1 and V2 may be derived from the vector signal VO and the vector signals X1 and X2 as shown by the graph of FIG. 4. With regard to the derivation of the vector signals V3 and V4, it must first be determined whether they are in a leading or lagging relationship. When the vector signal V4 is leading the vector signal V3, the generator is operating in the area which is above the abscissa R and the corresponding vectors are denoted as V3 and V4. On the other hand, when the vector signal V4 is lagging the vector signal V3, the operating area is below the abscissa R, and the vectors are denoted as V'3 and V'4, respectively. In either case, the vector signals V3 and V4 or V'3 and V'4 are derived from the impedance vector VO and the predetermined values of R1 and R2 as shown by the graph of FIG. 4.

Referring back to FIG. 5, the vector signals V1 and V2 may be alternating current (AC) signals and as such may be converted into rectangular AC wave shapes by conventional wave-shape forming circuits 41 and 42. The superposing zone of the converted rectangular AC wave shapes of V1 and V2 may be determined by an AND circuit 51. It is realized that this superposing zone of the converted signals V1 and V2 is indicative of the phase angle between the corresponding vectors V1 and V2. A signal 52a generated from the AND circuit 51 and representative of the V1-V2 phase angle may be provided to a conventional discriminating circuit 81 which generates an output signal 81a only when the V1-V2 phase angle represented by signal 51a is determined to fall within the hatched area enclosed by the curves 32 and 34 as shown in FIG. 4. In effect, the circuit 81 generates the signal 81a when the measured phase angle, between the vectors V1 and V2, such as that shown by $\alpha 1$ in FIG. 4, for example, is beyond a first predetermined angle value. Consequently, when the measured phase angle between the vector signals V1 and V2 is less than the predetermined angle, the signal 81a is not generated. The additional ciruit 91 may be included to prolong the output wave shape of the signal 81a and provide the prolonged signal 91a to one input of an AND gate 54.

In a similar manner, wave shape forming circuits 43 and 44 convert what may be alternating current (AC) vector signals V3 (V'3) and V4 (V'4) into rectangular AC wave shapes. The output of the circuit 43 is provided to the non-inverting inputs of AND gates 52, 53 and 61 and also to the inverting input of an AND gate 62. The output of the circuit 44 is provided to the non-inverting inputs of the AND gate 52, 53 and 62 and to the inverting input of the AND gate 61. In the present embodiment, the AND gates 61 and 62 function as inhibit circuits and their output signals are conditioned by corresponding gate pulse generating circuits 71 and 72. The gate pulse generating circuits 71 and 72 may operate dependently by looking at each other's output signals which is denoted by the double-arrowed line 73.

The angle between the vector signals V3 and V4 may be determined by the superposing zones of their rectangularly converted wave shapes determined by the AND gates 52 and 53 for the appropriate leading or lagging relationship of the vector signals. If in a leading relationship, the gate pulse generating circuit 72 is activataed by AND gate 62 to enable a wave shape superposing zone discriminating circuit 83 to operate on the signal 53a generated from the AND gate 53 and representative of the phase angle between the vector signals V3 and V4. When the measured phase angle signal 53a is beyond a second predetermined angle value, such as that shown by $\alpha 2$ in FIG. 4, for example, the circuit 83 generates a signal 83a which may be provided to another wave shape prolonging circuit 93 to prolong the wave shape thereof. The prolonged output signal 93a is provided to one input of an OR circuit 100. In the leading relationship state, the gate pulse generating circuit 71 is inhibited by the operation of the AND gate 61.

When in the vector signals V3 and V4 are in the lagging relationship state, the gate pulse generating circuit 72 is inhibited by the AND gate 62 and the gate pulse generating circuit 71 is activated by the AND gate 61 to enable another wave shape superposing zone discriminating circuit 82. The circuit 82 determines if the signal 52a generated by the AND gate 52 and representative of the phase angle between the vectors V'3 and V'4 is beyond a third predetermined angle value, such as that shown by the angle $\alpha 3$ in FIG. 4, for example. If such is the case, the circuit 82 generates a signal 82a indicative of this discriminated situation. A wave shape prolonging circuit 92 may prolong the signal 82a to form the signal 92a which may be provided to another input of the OR gate 100. The output of the OR gate 100 is provided to a second input of the AND gate 54.

Typical operational examples of the preferred embodiment of the protective relay will be described herebelow in connection with the graph of FIG. 4 and the block diagram schematic embodiment described in connection with FIG. 5. First, assume that the generator is operating with impedance characteristics within the hatched area of the upper right hand quadrant of the graph of FIG. 4 which is considered an unsafe operational area and one that should be protected against. Under these conditions, the circuit 20 may generate the AC vector signals V1 and V2 from the impedance signal VO and predetermined values X1 and X2. The wave shape squaring circuits 41 and 42 may convert the AC signals V1 and V2 into rectangular AC wave shapes from which the AND gate 51 may generate a signal 51a for the length of time of the superposing zone thereof which is representative of the phase angle between the vector signals V1 and V2. The discriminating circuit 81 determines if the measured angle between signals V1 and V2 is greater than the first predetermined angle value and generates the signal 81a indicative of this unsafe condition. The circuit 91 prolongs the signal 81a and provides the prolonged signal 91a to one input of the AND gate 54.

Concurrently, the circuits 43 and 44 square up the wave shapes of the AC vector signals V3 and V4 and provide the converted rectangular AC wave shapes to their corresponding downstream circuits. Since the relationship between the vector signals is a leading relationship, the AND gate 62 operates the gate pulsing circuit 72 to enable the discriminating circuit 83 while the AND gate 61 inhibits the pulse forming circuit 71. The AND gate 53 generates the signal 53a for the length of time of the superposing zone of its input signals which is representative of the angle between the vector signals V3 and V4. The discriminating circuit 83 which is operative under these leading conditions determines if the angle representative signal 53a is beyond the second predetermined angle value and if such is the case, the signal 83a is generated. The prolonging circuit 93 prolongs the signal 83a to form the signal 93a which is passed through the OR gate 100 to the other input of the AND gate 54. The AND gate 54 determines that both of the measured angles between the vector pair V1 and V2 and the vector pair V3 and V4 are beyond their respective predetermined angle values and in response generates a signal 54a which is indictive of this unsafe condition.

In another operational example, assume that the generator is performing with impedance characteristics falling within the hatched are in the lower right hand quadrant of the graph of FIG. 4. Under these conditions, the aforementioned circuits of FIG. 5 operating on the vector signals V1 and V2 will perform much in the same manner as that described hereabove to generate the signal 91a indicative of an unsafe condition with regard to the measured phase angle between the vector signals V1 and V2.

Now with regard to the signals V'3 and V'4, the AND gate 62 will operate to inhibit the pulse forming circuit 72. Moreover, the AND gate 61 operates in response to the converted wave form signals of circuits 43 and 44 to activate the generation of the gate pulse forming circuit 71 to enable the discriminating circuit 82. The angle between the vector signals V'3 and V'4 may be measured by the AND gate 52 which generates a representative signal 52a for the length of time of the superposing zone of its input signals. The discriminating circuit 82 determines if the measured angle signal 52a represents an angle beyond the second predetermined angle value and if such is the case, generates the signal 82a. The prolonging circuit 92 prolongs the generated signal 82a to form the signal 92a which is passed through the OR gate 100 to the other input of the AND gate 54. With the AND gate 54 detecting that both of the input signals thereof indicate unsafe conditions, it, in turn, generates the signal 54a to provide the necessary protection for the generator 10.

While the present invention has been described in connection with a preferred embodiment as shown by the graph of FIG. 4 and the block diagram schematic of FIG. 5, it is understood that the present invention should not be so limited but rather construed in broad scope and breadth in connection with the appended claims.

What is claimed is:

1. A protective relay protecting an electrical generator having terminal voltage and current and being of the type characterized by output performance limit curves, said protective relay having an operational boundary matched substantially to the output performance limit characteristics of said generator to enhance the protection thereof, said protective relay comprising:

first means for generating a signal representative of a discriminating impedance based on measurements of said generator's terminal voltage and current;

second means for generating a plurality of vector signals based on said generated discriminating impedance signal and a representation of said output performance limit curves of said generator; and means for determining when said generator is generating beyond its output performance limit characteristics based on a function of said plurality of vector signals.

2. The protective relay in accordance with claim 1 wherein the second generating means includes means governed by a plurality of predetermined signals based on the output performance limit curves of said generator to generate a corresponding plurality of vector signals as a function of the generated discriminating impedance signal and said plurality of predetermined signals.

3. The protective relay in accordance with claim 1 wherein the determining means includes means for determining when the generator is operating beyond its output performance limit characteristics based on the angle between at least one pair of generated vector signals.

4. The protective relay in accordance with claim 1 wherein the second generating means includes means governed by first and second pairs of predetermined signals based on the output performance limit curves of the generator to generate corresponding first and second pairs of vector signals as a function of the generated discriminating impedance signal and said first and second pairs of predetermined signals; and wherein the determining means includes means for determining when the generator is operating beyond its output performance limit characteristics based on both of the angles between the first and second pairs of vector signals.

5. The protective relay in accordance with claim 4 wherein the determining means includes:

third means for measuring the angle between the first pair of vector signals and for generating a first signal when said measured angle is beyond a first predetermined angle value;

fourth means for generating a second signal when the second pair of vector signals is in a leading condition and a third signal when the second pair of vector signals is in a lagging condition;

fifth means for measuring the angle between the second pair of vector signals and for generating a fourth signal representation of said measured angle;

sixth means governed by said second signal and said fourth signal and to generate a fifth signal when said measured angle between the second pair of vector signals is beyond a second predetermined angle value;

seventh means governed by said third signal and said fourth signal to generate said fifth signal when said measured angle between the second pair of vector signals is beyond a third predetermined angle value; and eighth means governed by said first and fifth signals to generate a signal indicative of the generator operating beyond its output performance limit characteristics.

6. A protective relay protecting an electrical generator having terminal voltage and current and being of the type characterized by output performance limit curves, said protective relay having an operational boundary matched substantially to the output performance limit characteristics of said generator to enhance the protection thereof, said protective relay comprising:

first means for generating a signal representative of a discriminating impedance based on measurements of said generator's terminal voltage and current;

second means governed by first and second pairs of predetermined signals based on the output performance limit curves of said generator to generate corresponding first and second pairs of alternating current (AC) vector signals as a function of the generated discriminating impedance signal and said first and second pairs of predetermined signals;

means for converting said first and second pairs of AC vector signals into corresponding rectangular wave shaped signals;

third means governed by the first pair of rectangular wave shaped signals to generate a first signal representative of the superposing zone of said first pair of signals, said first signal being representative of the phase angle between said first pair of vector signals;

fourth means governed by the second pair of rectangular wave shaped signals to generate a second signal representative of the superposing zone of said second pair of signals, said second signal being representative of the phase angle between said second pair of vector signals;

first discriminating means for generating a third signal when said first signal represents a phase angle value beyond a first predetermined angle value;

fifth means for generating a fourth signal when said second pair of vector signals is in a leading condition and for generating a fifth signal when said second pair of signals is in a lagging condition;

second discriminating means responsive to said fourth signal to generate a sixth signal when said second signal represents a phase angle beyond a second predetermined angle value;

third discriminating means responsive to said fifth signal to generate said sixth signal when said second signal represents a phase angle beyond a third predetermined angle value;

sixth means governed by said third and sixth signals for generating a signal indicating said generator is operating in an unsafe performance zone.

7. A protective relay in accordance with claim 6 including means for prolonging said third and sixth signals; and wherein the fifth means is governed by said prolonged third and sixth signals.

8. A protective relay in accordance with claim 6 wherein said third and fourth means both include an AND gate for generating a signal for the length of time of the superposing zone of their respective rectangular wave shaped vector signal pair, said time length of said generated signal being representative of the angle of the corresponding vector signal pair.

9. A protective relay in accordance with claim 6 wherein the fifth means includes:

first and second AND gates, each having their inputs coupled to the second pair of rectangular wave shaped signals, said first AND gate having one of said signal pair inverted at its input and said second AND gate having the other of said signal pair inverted at its input, said first AND gate generating a first gating signal when said second pair of rectangular wave shaped signals indicate a leading condition and said second AND gate generating a second gating signal when said second pair of rectangular wave shaped signals indicate a lagging condition; and first and second gate pulse generating circuits coupled respectively to said first and second AND gates and responsive respectively to said first and second gating signals to generate the corresponding fourth and fifth signals.

10. A protective relay in accordance with claim 9 wherein the first and second gate pulse forming circuits are dependently operative with regard to each other's generated signal.

* * * * *